D. W. CHISHOLM.
APPARATUS FOR THE MANUFACTURE OF WELDED TUBES.
APPLICATION FILED APR. 25, 1919.
1,380,356.
Patented June 7, 1921.
5 SHEETS—SHEET 3.
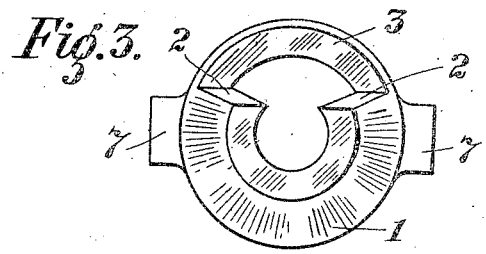
Fig.3.
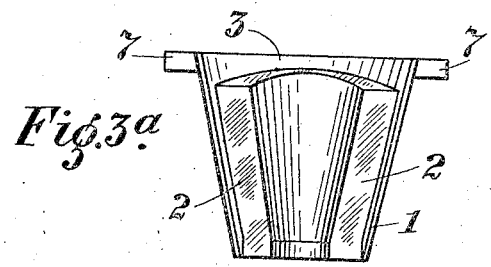
Fig.3ª
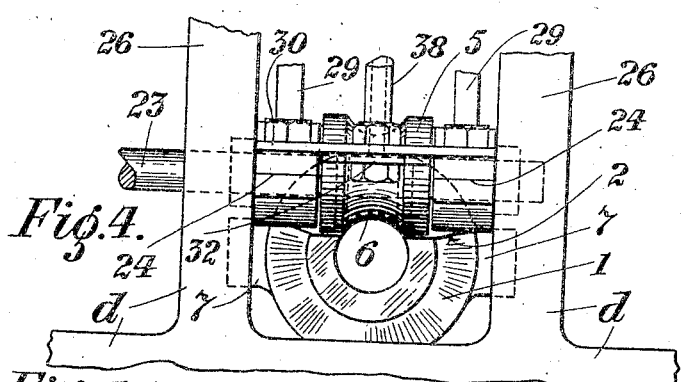
Fig.4.
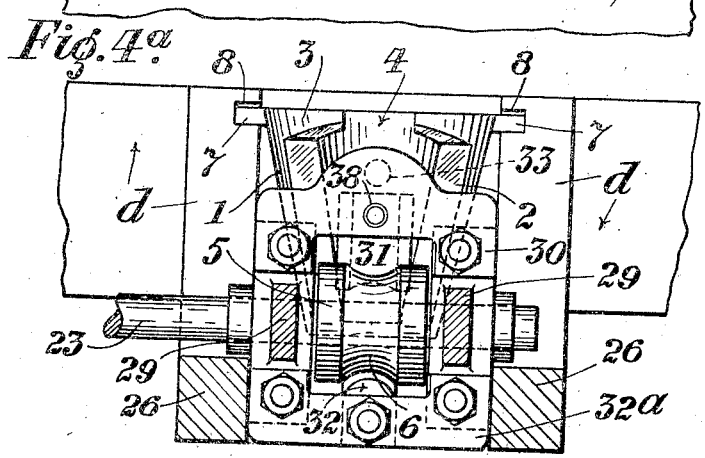
Fig.4ª

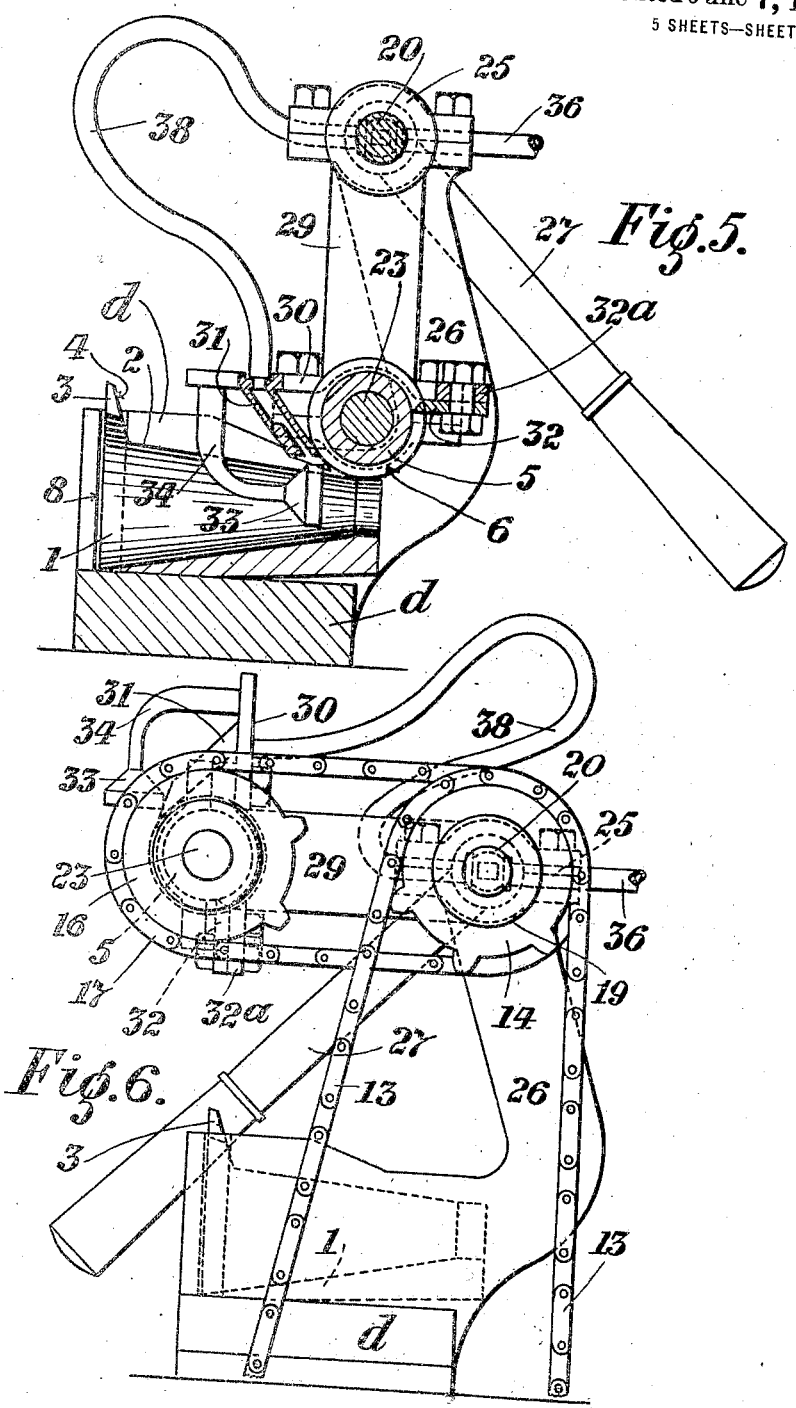

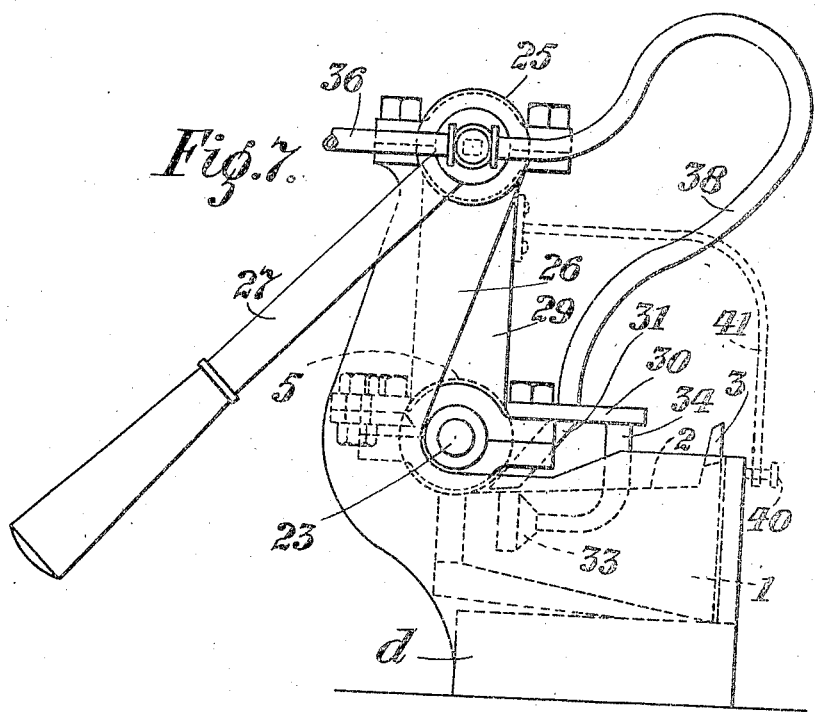
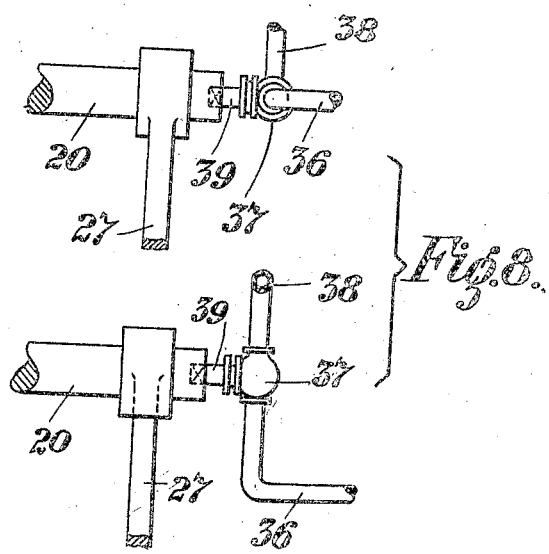

UNITED STATES PATENT OFFICE.

DOUGLAS WHIMSTER CHISHOLM, OF WOODHEAD, GARNKIRK, SCOTLAND.

APPARATUS FOR THE MANUFACTURE OF WELDED TUBES.

1,380,356.                  Specification of Letters Patent.      Patented June 7, 1921.

Application filed April 25, 1919. Serial No. 292,727.

*To all whom it may concern:*

Be it known that I, DOUGLAS WHIMSTER CHISHOLM, of Woodhead, Garnkirk, Lanarkshire, Scotland, a subject of the King of Great Britain, have invented certain new and useful Improvements Relating to Apparatus for the Manufacture of Welded Tubes, of which the following is a specification.

This invention relates to the manufacture of butt welded steel and iron tubes.

In the commercial manufacture of butt welded tubes it is usual to follow the old and well known process of drawing a heated strip out of the furnace and then seizing it by means of the draw bench tongs and pulling it, by the action of the draw bench chain, through a bell or die so shaped as to first turn up or skelp the strip and then close and weld it. Usually for iron tubes which do not require to stand great internal pressure, a single pass is sufficient but for stronger iron tubes or for steel tubes two or more passes are necessary. For each pass it is necessary to re-heat the tube before passing it again through the die or bell.

By means of the present invention I so improve this process that iron and steel tubes of the best quality can be produced at a single pass through the die or bell, the weld being so satisfactory that the tubes can be readily used in place of the ordinary lap welded and weldless tubes, and, further, not only can tubes of sizes which are usually butt welded be manufactured by the improved process but also tubes of the larger sizes and such as are usually lap welded.

Various methods have heretofore been proposed to achieve the same results but these have not, to my knowledge, been commercially successful and have failed to displace the old process of manufacture.

Under my invention I draw the heated strip through an incomplete bell or die with which a positively driven rotary member coacts in closing and welding the strip, which latter, as it passes through the bell or die, is acted on by oxygen gas (or other gas suitable for welding purposes) directed, through the incomplete portion of the bell or die, on to the edges of the strip in order to bring them to the heat necessary for effectively welding the edges together (hereinafter referred to as the "proper welding heat").

The rotary member is positively driven preferably from the chain wheel of the draw bench, while the gas is directed by means of a gas nozzle preferably arranged in proximity to and just in advance of the rotary member. The rotary member has, or may have a device for automatically scraping or cleaning it. The rotary member, the gas nozzle, the scraper and, also, if desired, a mandrel, are carried on a shaft mounted in suitable bearings on an extension of the housing or frame of the bell this shaft being capable of being turned by means of a handle, or otherwise, so as to move the rotary member, gas nozzle, etc., into and out of operative position as desired.

The gas supply is, preferably, controlled by means of a cock or valve capable of being automatically opened and closed by the movement of the shaft aforesaid, the arrangement, preferably, being such that when the rotary member and gas nozzle are moved into operative position the gas is automatically turned on and when the gas nozzle and rotary member are moved out of operative position the gas is automatically turned off.

In order that the invention may be clearly understood I have hereunto appended explanatory drawings which show, by way of illustration or example, one mode of carrying out the invention in actual practice.

Fig. 3 is a back end view of the bell or die. Fig. 3ª is a corresponding plan view.

Fig. 4 is a back end view of the die or bell with the roller in position. Fig. 4ª is a corresponding plan view.

Fig. 5 is a vertical section to an enlarged scale on the line 5—5 Fig. 2.

Fig. 6 is a corresponding side view but with the roller, mandrel, etc., moved out of position. The chain drive is also shown.

Fig. 7 is a corresponding view to Fig. 6, but from the opposite side and with the roller in position.

Fig. 8 shows detail views of the gas cock connection.

On the drawings the reference letters and numerals wherever repeated indicate the same parts.

Figure 1:
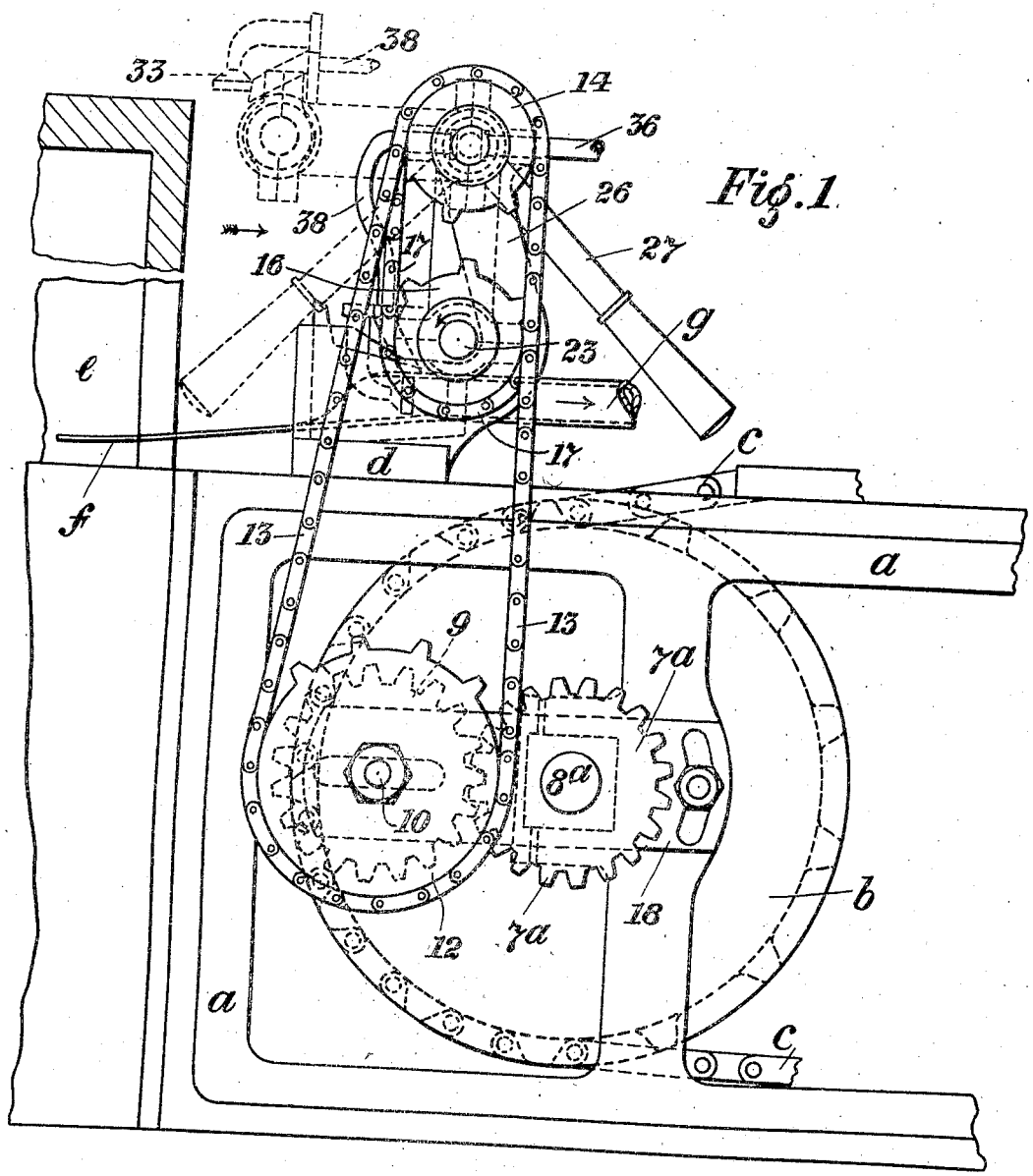
Figure 1 is a side elevation showing part of a draw bench with my improvements arranged in connection therewith.

*a* is the usual draw bench, *b* the usual front sprocket wheel, *c* the draw bench chain, *d* the frame or housing for the closing bell or die, *e* the furnace for heating the strips and *f* a strip which is being drawn out of the furnace and formed into a tube *g* in the well known manner.

I will now proceed to describe my improvements.

I use a bell or die 1 which, instead of being a complete hollow conic casting as usual, is incomplete, being made or formed with a gap or opening or the like. Preferably the bell is cut away at the parts 2, 2, the cut away parts extending the greater part of length of the upper side of the bell from the back, or narrow end, to near the front end which latter is either left intact as shown at 3 (Figs. 3 and 3ª) or has a small gap made in it as shown at 4. (Figs. 4 and 4ª). 7 are the usual lugs of the bell which fit into the usual recesses 8 of the frame *d* when the bell is dropped into place. Located so as to be, when in working position, just over the rear end of the bell so as to be capable of co-acting with it in closing and welding the strip, is a rotary member—preferably a small roller 5—which has a circumferential groove 6 in it, this groove being of such curvature as to complete the circle at the rear end of the bell, see Fig. 4. This roller is positively driven.

In the construction shown the roller is driven from the chain wheel *b* of the draw bench by means of the spur wheel 7ª (on the spindle 8ª of wheel *b*) change wheel 9, sprocket wheel 12, chain 13, sprocket wheels 14, 15, 16 and chain 17. The change wheel 9 is mounted on a stud 10 carried by a bracket 18 adjustably secured to the draw bench. The wheel 12 is keyed to the extended hub 11 of the wheel 9. The wheels 14 and 15 are both secured to a sleeve 19 rotatably mounted on the shaft 20, being held against lateral movement by collars 21, 22. The wheel 16 is secured to the end of the roller spindle 23. The shaft 20 is carried in bearings 25 on upward extensions or arms 26 formed in one with the housing *d*. The shaft 20 can be turned by a hand lever 27. Extending downward from the bosses 28 on the spindle 20 are two radial arms 29 which carry the bearings 24 for the spindle 23 and roller 5. The plate 30 which is secured to the bearings carries a nozzle 31 for directing gas on to the edges of the strip and a small mandrel 33. A scraper 32 for scraping and cleaning the groove of the roller may be secured to a plate 32ª fastened to the bearings. The mandrel is secured to the plate 30 by a curved arm 34. The nozzle 31 is made broad and flat, as shown, with one, or more, narrow slits or outlets for the gas, the nozzle being so shaped as to properly direct the gas, through the incomplete portion of the bell, on to the strip, at the edges and the parts in the immediate neighborhood thereof, to bring the metal at the seam to the proper welding heat. As will be seen (Fig. 5) the nozzle projects downward at the incomplete portion of the bell and is inclined so as to direct the gas at an angle on to the edges of the strip just before the same are acted on by the roller.

The part 3 of the bell is left intact when there is room enough to allow of the mandrel 33 swinging clear but when there is not enough room a gap 4 wider than the mandrel, is made in the part 3.

The gas is supplied from a cylinder or other suitable source of supply at a suitable pressure—in practice I have found a pressure of 25 to 30 lbs. per square inch to give excellent results when oxygen gas is used, the pressure being regulated by means of a suitable cock or valve. The gas is conveyed by a pipe 36 to a plug cock 37 and from thence by a flexible pipe 38 to the nozzle 31. The plug 39 of the cock (see Fig. 8) is square ended and is secured in a corresponding hole at the end of the shaft 20 so that when the shaft is turned the plug is turned to open or close the cock.

I prefer to arrange that the draw bench chain shall move at a speed higher than that of the roller; thus, for butt welded steel tubes, one inch gas size, the draw bench chain *c* is driven at the rate of about 247 feet per minute while the roller is geared so as to revolve at a surface speed of about 98 feet per minute, the roller being arranged to rotate anti-clockwise so that it will co-act with the draw bench tongs in pulling the tube through the bell—see Fig. 1. Of course, for larger or smaller sizes of tubes, the speed can be altered.

The scraper, as will be seen, Fig. 4ª, is curved at its end to conform to the groove of the roller and the nozzle is likewise curved at its end to conform to the curvature of the tube.

The arrangement is such that by simply moving the hand lever 27, the roller, gas nozzle, mandrel and scraper can be moved into and out of operative position, as desired, and, at the same time, the gas be turned on and off. This is a very important factor in the successful carrying out of the process as it is essential the gas be turned on and off at the proper times and with the minimum of waste. Owing to the special chain drive the roller is always operably connected with the draw bench.

The arrangement whereby the roller, etc., can be readily turned or swung up is a great advantage as it enables the bell to be quickly changed and the gas nozzle to be examined and cleaned whenever necessary.

Figure 2:
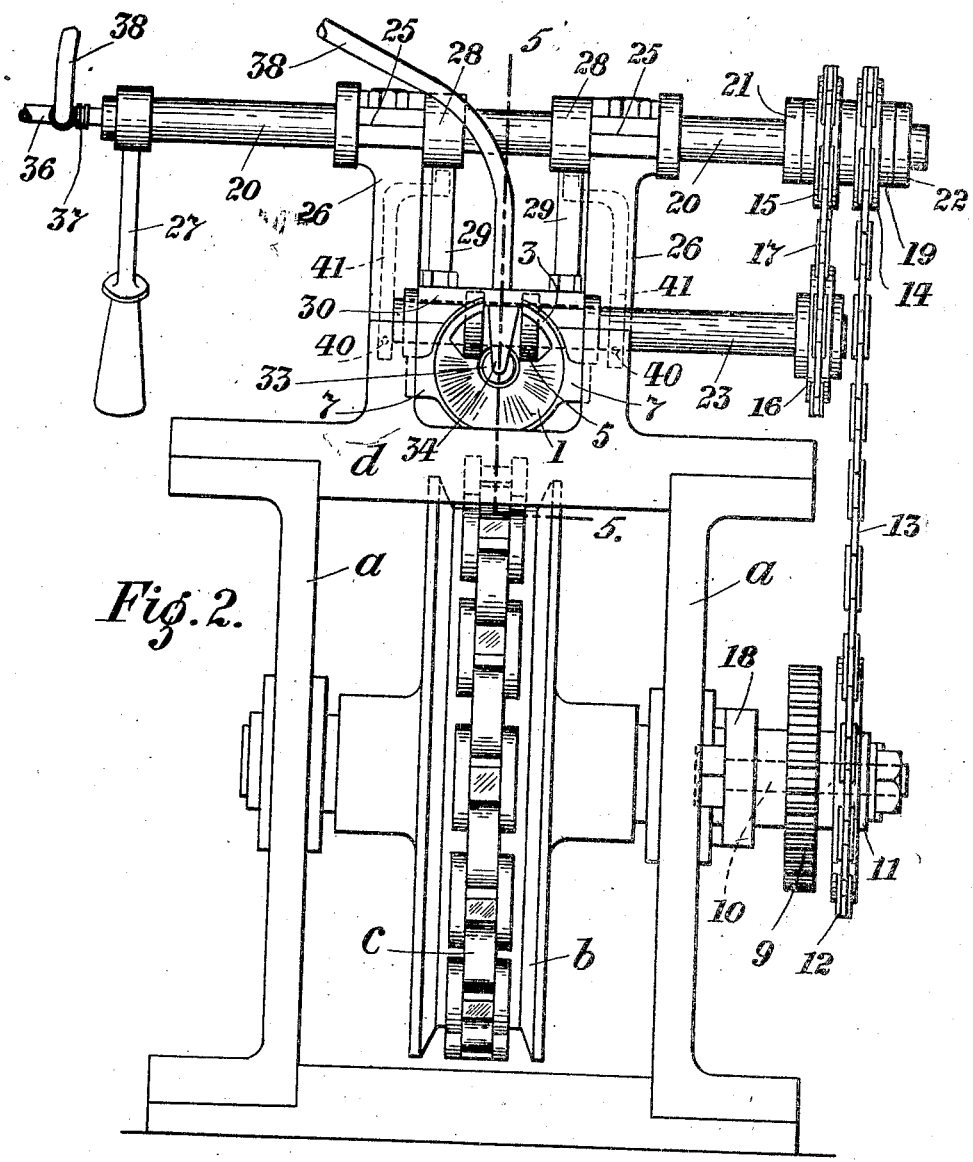
Fig. 2 is a corresponding end elevation looking in the direction of the arrow Fig. 1.

The gas nozzle and roller may be nicely adjusted in position by means of adjusting screws 40 on arms 41, as indicated in dotted lines, Figs. 2 and 7, The strip, heated in the furnace as usual, is entered into the bell or die and seized by the draw bench tongs and is skelped and welded, under the influence of the gas, by the co-action of the bell and roller.

As shown on the drawings the apparatus is constructed and the bell is made for closing the seam of the skelped strip at the upper side of the bell but the construction may obviously be altered and the opening may be arranged in any other suitable position.

In all cases I prefer to use oxygen gas as I have found it to give excellent results but I do not confine myself thereto as it is obvious other known gases used for welding purposes may be employed, such as oxy-acetylene gas, for example. I have myself tried quite a number of gases with the object of raising the edges of the strip to the proper welding heat but I have found none so suitable for this purpose as oxygen. Oxyacetylene I found to be very difficult to properly regulate and it was also liable to burn both the tubes and the bells.

Having now fully described my invention what I claim and desire to secure by Letters Patent is:—

1. Apparatus for manufacturing butt welded tubes from heated metal strips having, in combination, a bell through which the heated strip is drawn and having a gap therein, a rotary member operating in said gap and co-acting with the bell to weld the tube, means for directing gas into the bell through said gap and upon the strip, and means for drawing the strip through the bell.

2. Apparatus for manufacturing butt welded tubes from heated metal strips having, in combination, a bell through which the heated strip is drawn and having a gap therein, a rotary member operating in the gap and coacting with the bell to weld the tube, means for positively driving the rotary member, means for directing gas into the bell through said gap and upon the strip, and means for drawing the strip through the bell.

3. An apparatus for manufacturing butt welded tubes from heated metal strips, having, in combination, a bell through which the heated strip is drawn and having a gap therein, a rotary member co-acting with the bell, means for positively driving the rotary member, means whereby the rotary member can be moved into and out of action, means for directing gas into the bell through said gap and upon the strip, means for drawing the strip through the bell, and means whereby the gas is turned on and off by the movement of the rotary member into and out of action.

4. An apparatus for manufacturing butt welded tubes from heated metal strips having, in combination, a bell through which the heated strip is drawn and having a gap therein, means operating in the gap and cooperating with the bell for closing the edges of the strip, means for directing gas into the bell through said gap and upon the strip, and means for drawing the strip through the bell.

5. An apparatus for manufacturing butt welded tubes from heated metal strips having, in combination, a bell through which the heated strip is drawn, said bell having a gap therein, means operating in said gap and coöperating with the bell to close the edges of the strip, means for directing gas into the bell through said gap and upon the strip, and draw bench means for drawing the strip through the bell.

6. Apparatus for manufacturing butt welded tubes from heated metal strips having, in combination, a bell through which the heated strip is drawn and having a gap therein, means for directing gas into the bell through said gap and upon the strip, means for turning the gas on and off, a rotary member co-acting with the bell, means for positively driving the rotary member, means whereby the rotary member can be moved into and out of action, and means for drawing the strip through the bell, the means for turning the gas on and off being operated by the means for moving the rotary member into and out of action.

7. Apparatus for manufacturing butt welded tubes from heated metal strips having, in combination, a bell with an opening at its upper side, a roller co-acting with the bell, the periphery of the roller being shaped to coincide with the inner wall of said bell, means carrying the roller, a nozzle for directing gas through the opening into said bell, means for supplying gas to said nozzle and means controlling said gas supply.

8. Apparatus for manufacturing butt welded tubes from heated metal strips having, in combination, a bell with an opening at its upper side, a roller projecting into the said opening in the bell, the periphery of the roller being shaped to coincide with the inner wall of the bell, means for positively rotating said roller, means carrying the roller, a nozzle for directing gas through the opening into said bell, means for supplying gas to said nozzle and means controlling said gas supply.

9. Apparatus for manufacturing butt welded tubes from heated metal strips having, in combination, a bell with an opening at its upper side, a roller co-acting with the bell, chain and sprocket means for positively rotating said roller, means carrying the roller, a nozzle for directing gas through the opening into said bell, means for supplying gas to said nozzle and means controlling said gas supply.

10. Apparatus for manufacturing butt welded tubes from heated metal strips having, in combination, a bell with an opening at its upper side, a roller operating in said gap and co-acting with the bell to weld the tube, means carrying the roller, a nozzle for directing gas obliquely through the opening into said bell, means for supplying gas to said nozzle and means controlling said gas supply.

11. Apparatus for manufacturing butt welded tubes from heated metal strips having, in combination, a bell with an opening at its upper side, a roller co-acting with the bell, a gas nozzle, a mandrel, means carrying the roller, nozzle and mandrel and means for moving the roller, nozzle and mandrel simultaneously into and out of position.

12. Apparatus for manufacturing butt welded tubes from heated metal strips having, in combination, a bell with an opening at its upper side, a roller co-acting with the bell, a gas nozzle, means for supplying gas to the nozzle, a mandrel, means carrying the roller, nozzle and mandrel and means for moving the roller, nozzle and mandrel simultaneously into and out of position, said last mentioned means also turning on and off the gas supply.

13. In the manufacture of butt welded tubes, the combination of a bell or die having a gap therein, a grooved roller operating in the gap and adapted to co-act with the die to close and weld the heated strip, means for supporting the grooved roller in operative position, a mandrel, a gas nozzle arranged in conjunction with the roller for directing gas into the bell through the said gap, means for supplying gas to the nozzle, means for controlling the supply of gas, in combination with draw bench mechanism, and gear mechanism for driving the roller from the said draw bench mechanism.

14. An apparatus for the manufacture of butt welded tubes from heated metal strips and embodying a bell having an opening in its upper side, means coöperating with the said bell for closing the edges of the strip, a gas nozzle for directing gas into the bell through said opening, a mandrel, means for actuating the first recited means, and means common to the first recited means, nozzle and mandrel for moving them into and out of operative position with respect to the bell.

15. An apparatus for the manufacture of butt welded tubes from heated metal strips and embodying a bell having an opening in its upper side, means coöperating with the said bell for closing the edges of the strip, a gas nozzle for directing gas into the bell through said opening, a mandrel, and means common to the first recited means, nozzle and mandrel for simultaneously moving them into and out of operative position.

In testimony whereof I affix my signature in presence of two witnesses.

DOUGLAS WHIMSTER CHISHOLM.

Witnesses:
WM. MCTAGGART,
EDWARD MCGREGOR NAYLOR.